March 13, 1951 E. F. GARDNER 2,544,785
FLUID BRAKE SYSTEM
Filed April 29, 1949 2 Sheets-Sheet 1
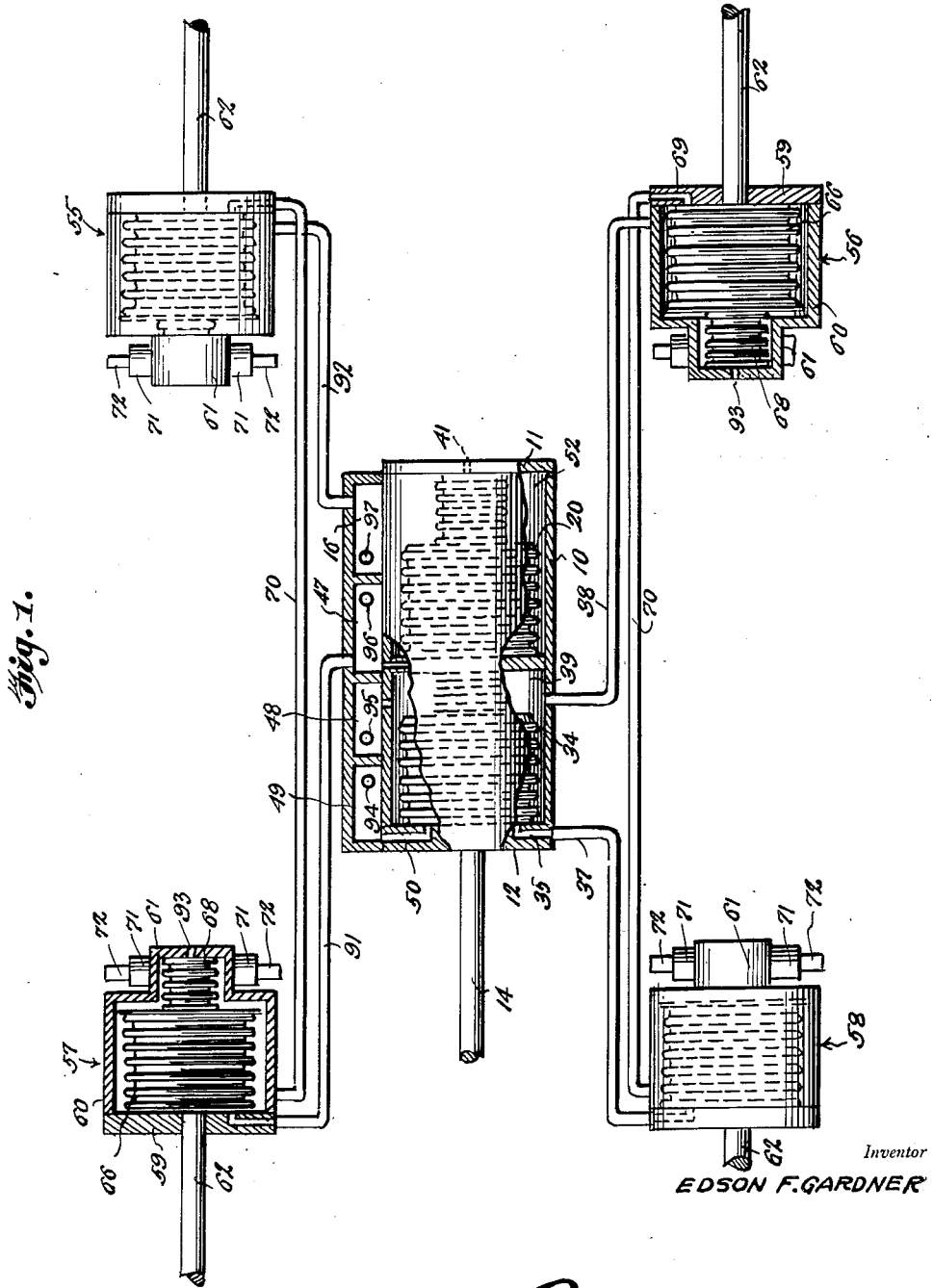
Inventor
EDSON F. GARDNER
By Patrick D. Beavers
Attorney March 13, 1951 E. F. GARDNER 2,544,785
FLUID BRAKE SYSTEM
Filed April 29, 1949 2 Sheets-Sheet 2
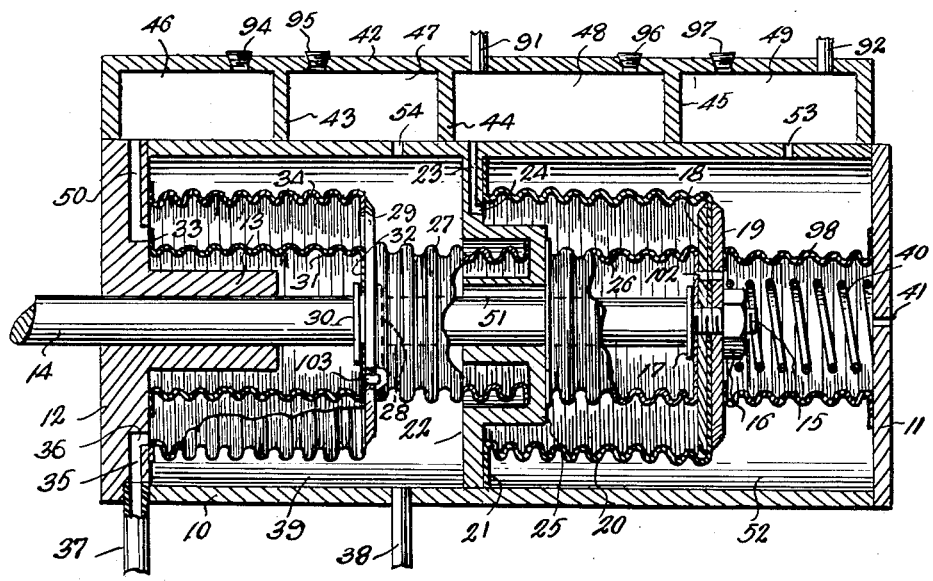
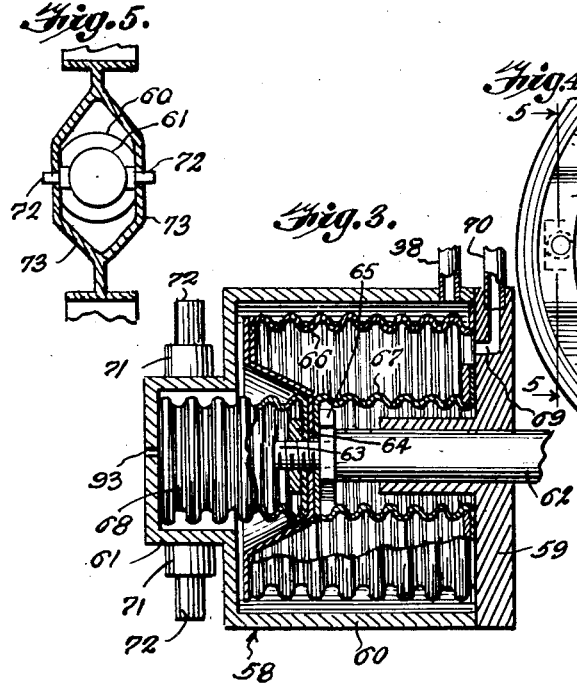
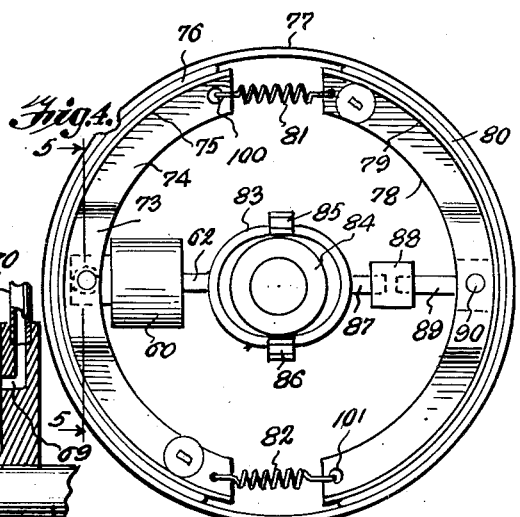
Inventor
EDSON F. GARDNER
By Patrick J. Beavers
Attorney Patented Mar. 13, 1951

2,544,785

UNITED STATES PATENT OFFICE 2,544,785

FLUID BRAKE SYSTEM

Edson F. Gardner, Moscow, Pa.

Application April 29, 1949, Serial No. 90,465

7 Claims. (Cl. 60—54.5)

The present invention relates to a fluid brake system and it consists in the combinations, constructions and arrangements of parts herein described and claimed.

Generally the invention comprises a fluid brake system including a master cylinder and a plurality of subsidiary cylinders connected therewith and in which means is provided whereby mechanical pressure applied within the master cylinder is transmitted equally to the subsidiary cylinders. The invention is illustrated as being utilized in a fluid braking system but is obviously capable of many other allied uses.

It is accordingly an object of the invention to provide a fluid brake system of the character set forth which is simple in its construction and operation and yet effective and efficient in use.

Another object of the invention is the provision of a fluid braking system having means whereby pressure applied to a main cylinder is equally distributed to a plurality of subsidiary cylinders.

Another object of the invention is the provision of a system of the character set forth in which the possibility of leakage of hydraulic fluid is at a minimum.

A further object of the invention is the provision of a hydraulic braking system wherein the failure of one of the subsidiary units will not cause a breakdown of the entire system.

Other and further objects of the invention will become apparent from a reading of the following specification taken in conjunction with the drawings, in which:

Figure 1 is a plan view, partly in section, of a system embodying the present invention, Figure 2 is a vertical sectional view of a main cylinder and attendant mechanisms forming a part of the present invention, Figure 3 is a vertical sectional view of a subsidiary cylinder and its attendant mechanisms, Figure 4 is a reduced view of an internal expansion type brake to which the present system is applied, and Figure 5 is an enlarged sectional view taken along line 5—5 of Figure 4.

Referring more particularly to the drawings, there is shown therein a master cylinder 10 having a closed wall 11 at one end and a head 12 at the other end thereof.

The head 12 is provided upon its inner side with an integrally formed inwardly extending collar 13 in which is journaled a rod 14 which is provided at its inner end with a threaded extension 15 upon which is mounted a nut 16. Adjacent the extension 15 the rod 14 is provided with an annular portion 17 between which and the nut 16 is confined a pair of circular plates 18 and 19 which, in turn, hold between them one end of a diaphragm 20, the other end of which is affixed, as indicated at 21, to a partition 22 extending approximately midway across the interior of the cylinder 10.

A passage 23 extends laterally through the partition 22 and communicates, as indicated at 24, with the interior of the diaphragm 20. The partition 22 is provided with a depressed portion 25 to the inner side of which is affixed one end of a diaphragm 26 the other end of which is affixed between the plate 18 and the annular member 17.

In the outer side of the depressed portion 25 one end of a diaphragm 27 is connected and the other end of the same is confined between an annular member 28 and on the shaft 14 and a plate 29 surrounding the shaft. An annular member 30 is also formed upon the shaft 14 and confines one end of an inner diaphragm 31 between itself and the plate 29, as indicated at 32. The other end of the inner diaphragm 31 is affixed to the inner side of the head 12, as indicated at 33.

An outer diaphragm 34, which is concentric with the inner diaphragm 31, is affixed to the plate 29 and to the inner face of the head 12 which is provided with an outwardly extending opening 35 which communicates at its inner end, as indicated at 36, with the space between the diaphragms 31 and 34 and at its outer end communicates with a duct 37.

A duct 38 is mounted in the wall of the cylinder 10 and communicates with a compartment 39 formed by the head 12, the partition 22 and the walls of the cylinder 10. A compression spring 40 bears against the wall 11 and against the plate 19 and the wall 11 is provided centrally with a vent 41.

Attached to the master cylinder 10 is a housing 42 wherein is provided bulkheads 43, 44 and 45 which form expansion chambers 46, 47, 48 and 49. A passage 50 interconnects the chamber 46 and the interior space between the diaphragms 31 and 34 and a vent passage interconnects the interiors of the diaphragm 26 and 27, the vents being indicated at 51.

The wall 11, the partition 22 and the walls of the master cylinder 10 form a compartment 52 and a passage is provided in the wall of the cylinder 10, as indicated at 53 for a communication between the compartment 52 and the chamber 49. A like passage 54 intercommunicates between the chamber 47 and the compartment 39.

In the drawings, in Figure 1 there is shown four subsidiary cylinders generally indicated at 55, 56, 57 and 58. Each of the cylinders 55 to 58, inclusive, is provided with a head 59, a cylindrical body 60 and a reduced cylindrical portion 61. In each case, also, through the head 59 is slidably mounted a rod 62 the inner end of which is provided with a threaded reduced portion 63 upon which is mounted a nut 64 which confines between itself and an annular portion 65 of the rod 62 the inner head of an outer diaphragm 66, an inner diaphragm 67 concentric with the diaphragm 66 and a complementary diaphragm 68 which latter is fastened at its outer end in the reduced portion 61. The diaphragms 66 and 67 are fastened at their other ends to the inner face of the head 59 which is provided with a passage 69 which communicates with the space defined by the walls of the diaphragms 66 and 67 and with a duct 70. The space between the outer diaphragm 66 and the walls 60 of the subsidiary cylinders are connected to a duct 38 which, in turn, connects with the compartment 39. An equalizing passage 102 interconnects the interiors of the diaphragms 98 and 26 and a like passage 103 interconnects the interiors of the diaphragms 27 and 31.

Each of the subsidiary cylinders 55, 56, 57 and 58 is provided with a pair of outwardly extending bosses 71 which are attached to the reduced portion 61 and the bosses 71 are each provided with an ear 72 which is mounted in a split portion 73 of a web 74. The web 74 is provided with a brake shoe 75 which is, in turn, provided with a lining material 76 which bears against the inner side of a brake drum 77. A complementary web 78 is provided with a shoe 79, lining material 80 and is likewise mounted within the drum 77. A pair of anti-chatter springs 81 and 82 interconnect the ends of the webs 74 and 78. The webs 74 and 78 are respectively provided with adjustable anchors 100 and 101.

The rod 62 is connected to a yoke 83 surrounding a conventional axle 84 and provided with aligning brackets 85 and 86 and the yoke is in turn provided with a projection 87 which is connected by means of a turnbuckle 88 to a stub shaft 89 which is finally connected by means of pins 90 to the web 78.

The chambers 48 and 49 of the housing 42 are provided respectively with ducts 91 and 92. A vent 93 is provided centrally in the reduced portion 61 and communicates with the interior of the diaphragm 68. At each of the expansion chambers 46, 47, 48 and 49 is respectively provided with a filler plug 94, 95, 96 and 97.

In the operation of the device as shown in the drawings, it will be apparent that when pressure is placed upon the rod 14 to move the same inwardly of the master cylinder 10, the hydraulic fluid contained in the chambers 39 and 52 will be forced outwardly therefrom through the ducts 38 and 92 into that space between the walls 60 and the outer sides of the diaphragms 66 contained in the subsidiary cylinders 55 and 56. This action will cause the diaphragms 66 in the cylinders 55 and 56 to be forced into a more compact mass thereby driving the rod 62 in each case outwardly of the cylinders 55 and 56 to thereby operate the respective brakes attached thereto.

When this action occurs fluid contained between the walls of the diaphragms 66 and 67 in the cylinders 55 and 56 will be forced outwardly through the ducts 70 and into the spaces between the walls 60 and the outer sides of the diaphragms 66 in the cylinders 57 and 58 to thereby compress the diaphragms 66 and 67 therein and to force outwardly therefrom the shafts 62 to operate the brakes thereto attached.

As the last mentioned action occurs fluid contained between the diaphragms 66 and 67 of the cylinders 57 and 58 will be forced through the passages 69 and into the ducts 70 as shown in Figure 3 which ducts are indicated at 37 and 91 in Figure 1 of the drawings, and thence through the passage 35 into the interior of the diaphragm 34 and, through the chamber 48 and passage 23 into the interior of the diaphragm 20. Since the spring 40 is compressed when the shaft 14 is moved inwardly of the master cylinder, release of pressure upon the shaft 14 will allow the spring 40 to return the rod 14 to its original position thereby reversing all of the actions above mentioned and thus releasing all of the brakes attached to the subsidiary cylinders. Since the sizes of the diaphragms 20 and 34 are identical, the pressure reaching the outer sides of the diaphragms 66 contained in the cylinders 55 and 56 will likewise be equal and, since the spaces contained within the diaphragms 66 and 67 in the cylinders 55 and 56 are also equal, then the pressure exuding from the cylinders 55 and 56 into the ducts 70 and thence into the cylinders 57 and 58 will likewise be equal thereby assuring that all of the brakes attached to the subsidiary cylinders will receive an equal hydraulic pressure when the shaft 14 is pressed inwardly into the main cylinder.

A diaphragm 98 interconnects the plate 19 and the inner face of the wall 11 and surrounds the nut 16 and spring 40. It will be noted that the diaphragm 98, the diaphragms 26, 27, 31, all have identical displacement and that likewise the diaphragms 67 and 68 contained in each of the cylinders 55, 56, 57 and 58 are also of equal displacement and that hence for a given stroke of the rod 14 an equal force will be applied to the rods 62.

As to the brakes to which the subsidiary cylinders are attached, it will be quite apparent that when the rod 62 is forced outwardly of the subsidiary cylinder that it will move the yoke 83 and hence the projection 87 and the stub shaft 89 outwardly from the subsidiary cylinder thereby causing the webs 74 and 78 to move apart and to force the brake lining against the drum in conventional manner. The turnbuckle 88 is supplied for adjusting the effective length of the shaft 89 to take care of wear upon the brake band.

The safety factor may be further increased by providing a master cylinder with four compartments instead of the two shown herein, each compartment and its attendant mechanisms controlling one brake and, again, the system might be simplified by connecting the brakes in series with a master cylinder having a single compartment.

While but one form of the invention has been shown and described herein, it will be readily apparent to those skilled in the art that many minor modifications may be made herein without departing from the spirit of the invention or the scope of the appended claims.

What is claimed is:

1. A system of the character described including a master cylinder having a pair of compartments therein, two pairs of subsidiary cylinders, a main rod extending into the master cylinder, means associated with the main rod for compressing a fluid in each of said compartments, a compressible element in each of said subsidiary cylinders, means for transmitting fluid pressure to one end of each pair of subsidiary cylinders from each compartment in the master cylinder to thereby compress the compressible element in such subsidiary cylinders and means interconnecting the other end of each of such subsidiary cylinders with an end of the remaining cylinder of the pair to impart fluid pressure to the compressible elements in the latter cylinders.

2. A system of the character described including a master cylinder having a pair of compartments therein, two pairs of subsidiary cylinders, a main rod extending into the master cylinder, a rod extending through one end of each of the subsidiary cylinders and movable by said compressible element, means associated with the main rod for compressing a fluid in each of said compartments, a compressible element in each of said subsidiary cylinders, means for transmitting fluid pressure to one end of each pair of subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders.

3. A system of the character described including a master cylinder having a pair of compartments therein, two pairs of subsidiary cylinders, a main rod extending into the master cylinder, means associated with the main rod for compressing a fluid in each of said compartments, a compressible element in each of said subsidiary cylinders each of said compressible elements forming an interior chamber therein and an exterior chamber between such compressible elements and the walls of its associated subsidiary cylinder, a rod extending through one end of each of the subsidiary cylinders and movable by said compressible element, means for transmitting fluid pressure to one end of each pair of subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders, said means associated with the main rod for compressing a fluid in each of the compartments in the master cylinder including a pair of concentric diaphragms in each compartment affixed to the main rod and to the master cylinder, each of said pairs of concentric diaphragms forming an interior chamber therebetween and an exterior chamber between the outer diaphragm and the walls of the cylinder, and a duct interconnecting the space in the exterior chamber of each compartment in said master cylinder to the exterior chambers in one of each pair of subsidiary cylinders.

4. A system of the character described including a master cylinder having a pair of compartments therein, two pairs of subsidiary cylinders, a main rod extending into the master cylinder, a pair of concentric diaphragms in each compartment affixed to the main rod, each of said pairs of concentric diaphragms forming an interior chamber therebetween and an exterior chamber between the outer diaphragm and the walls of the cylinder means associated with the main rod for compressing a fluid in each of said compartments, a compressible element in each of said subsidiary cylinders, each of said compressible elements forming an interior chamber therein and an exterior chamber between such compressible elements and the walls of its associated subsidiary cylinder, a rod extending through one end of each of the subsidiary cylinders and movable by said compressible element, means for transmitting fluid pressure to one of each pair of subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders, said last-mentioned means including a duct interconnecting the interior chamber formed by each of the compressible elements in said subsidiary cylinders and movable by the master cylinder and the exterior chamber of the other of each pair of subsidiary cylinders formed by the compressible elements therein.

5. A system of the character described including a master cylinder having a pair of compartments therein, two pairs of subsidiary cylinders, a main rod extending into the master cylinder, means associated with the main rod for compressing a fluid in each of said compartments, a compressible element in each of said subsidiary cylinders each of said compressible elements forming an interior chamber therein and an exterior chamber between such compressible elements and the walls of its associated subsidiary cylinder, a rod extending through one end of each of the subsidiary cylinders and movable by said compressible element, means for transmitting fluid pressure to one end of each pair of subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders, said last-mentioned means including a duct interconnecting the interior of each of the compressible elements movable by the master cylinder and the other of each pair of subsidiary cylinders exteriorly the compressible elements therein and said means associated with the main rod for compressing a fluid in each of the compartments in the master cylinder including a pair of concentric diaphragms in each compartment affixed to the main rod and to the master cylinder, each of said pairs of concentric diaphragms forming an interior chamber therebetween and an exterior chamber between the outer diaphragm and the walls of the cylinder, and a duct interconnecting the space in the exterior chamber of each compartment in said master cylinder to the exterior chambers in one of each pair of subsidiary cylinders.

6. A system of the character described including a master cylinder having a pair of compartments therein, two pairs of subsidiary cylinders, a main rod extending into the master cylinder, a spring in said master cylinder compressible by the inward movement of the main rod, means associated with the main rod for compressing a fluid in each of said compartments, a compressible element in each of said subsidiary cylinders, a rod extending through one end of each of the subsidiary cylinders and movable by said compressible element, means for transmitting fluid pressure to one end of each pair of said subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders.

7. A system of the character described including a master cylinder having a pair of compartments therein, two pairs of subsidiary cylinders, a main rod extending into the master cylinder, a pair of diaphragms in each compartment affixed to the main rod, a spring in said master cylinder compressible by the inward movement of the main rod, means associated with the main rod for compressing a fluid in each of said compartments, a compressible element in each of said subsidiary cylinders, each of said compressible elements forming an interior chamber therein and an exterior chamber between such compressible elements and the walls of its associated subsidiary cylinder, a rod extending through one end of each of the subsidiary cylinders and movable by said compressible element, means for transmitting fluid pressure to one end of each pair of said subsidiary cylinders from each compartment in the master cylinder to thereby compress the compressible element in such subsidiary cylinders and means interconnecting the other end of each of such subsidiary cylinders with an end of the remaining cylinder of each pair to impart fluid pressure to the compressible elements in the latter cylinders, said last-mentioned means including a duct interconnecting the interior of each of the compressible elements movable by the master cylinder and the other of each pair of subsidiary cylinders exteriorly of the compressible elements therein and said means associated with the main rod for compressing a fluid in each of the compartments in the master cylinder including a pair of concentric diaphragms in each compartment affixed to the main rod and to the master cylinder and a duct interconnecting the exterior chamber of each compartment to an interior chamber in one of each pair of subsidiary cylinders.

EDSON F. GARDNER.

REFERENCES CITED

The following references are of record in the file of this patent:

UNITED STATES PATENTS

| Number | Name | Date |
| --- | --- | --- |
| 2,074,719 | Carroll | Mar. 23, 1937 |
| 2,081,056 | Loweke | May 18, 1937 |
| 2,157,733 | Sessions | May 9, 1939 |
| 2,239,751 | Kritzer | Apr. 29, 1941 |

FOREIGN PATENTS

| Number | Country | Date |
| --- | --- | --- |
| 374,084 | Italy | Aug. 14, 1939 |